Aug. 21, 1934.    J. M. BARRETT    1,970,726
VALVE
Filed Feb. 18, 1931

INVENTOR
Joseph M. Barrett
BY
ATTORNEY

Patented Aug. 21, 1934

1,970,726

UNITED STATES PATENT OFFICE 1,970,726

VALVE

Joseph M. Barrett, Cleveland Heights, Ohio, assignor to Bailey Meter Company, a corporation of Delaware Application February 18, 1931, Serial No. 516,690

10 Claims. (Cl. 251—34)

This invention relates to valves, and more specifically to single seating valves having coniformed seats.

The primary object of the invention is to provide such a construction for a valve of this general type that desirable flow characteristics may be obtained while attritive wear or wire-drawing is reduced to a minimum.

A further object is to so arrange the parts of the valve that the velocity of fluid flow past the seat, when the valve is partially or wholly open, is less than through other passages of the valve wherein the volume flow is controlled.

With these and further objects in view, I will describe the drawing which represent certain preferred embodiments of my invention.

Figures 1, 2, 3, 4, 5:
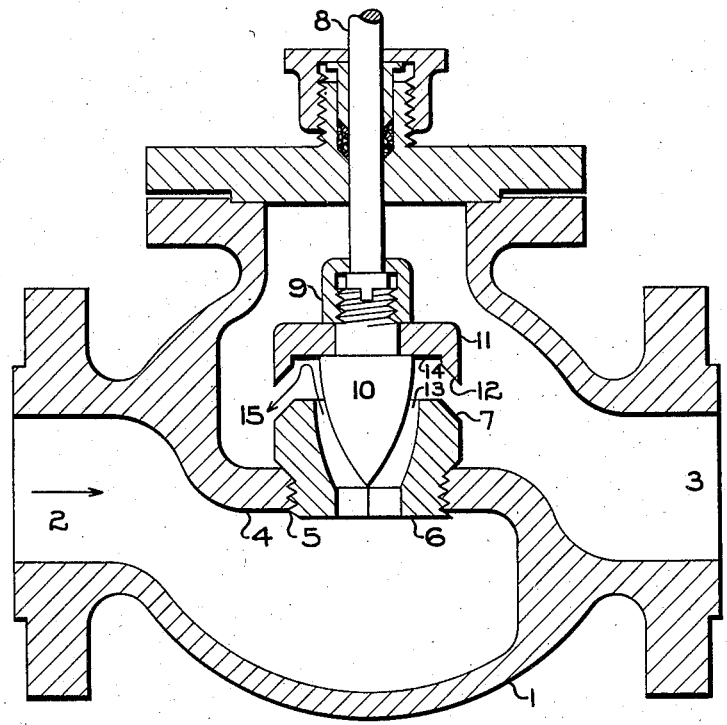
Fig. 1 is a sectional elevation of a valve illustrating the invention.
Fig. 2 is a partially sectioned, fragmentary drawing, of another form of the invention.
Fig. 3 is a side elevation of a valve member shown in Fig. 2.
Fig. 4 is a sectional plan along the line 4—4 in the direction of the arrows, of Fig. 3.
Fig. 5 is a partially sectioned plan along the line 5—5 in the direction of the arrows of Fig. 2.

In the drawing I designate at 1 the casing of an ordinary single seat globe valve provided with inlet and outlet branches 2 and 3 respectively, and with a dividing wall or partition 4 lying in a horizontal plane and in which is formed an opening 5. In the opening 5 is screw threaded a seat member 6 having on its upper part a coniformed seating surface 7.

A valve stem 8 extends external of the valve casing 1 through suitable packing means, and is capable of being positioned relative to the seat member 6 by lever action, screw threading or other desirable means. At its lower end the valve stem 8 has an enlargement forming a shoulder, against which a cap 9 rests; the cap 9 being internally screw threaded for joining a plug member 10 which forms an extension of the valve stem. A valve member 11 is held between the cap 9 and a projection of the plug member 10, and has a coniformed seating surface 12 adapted to engage the coniformed seating surface 7 of the seat member 6, for sealing the valve from flow therethrough when the valve stem 8 is in its lowermost position.

In Fig. 1 I have shown by means of arrows the direction of flow of a fluid through the casing, and between the valve sealing surfaces when the valve is in a partially opened condition. The surface of the plug member 10 below the point of joining with the valve member 11 is similar in contour to the interior surface of the seat member 6, and when the valve sealing surfaces 7 and 12 are in engagement, the plug member 10 desirably matches the opening of the seat member 6 with very little clearance. Curvature of the plug member 10 and of the interior of the seat member 6 are such as to give a desired characteristic of rate of fluid flow through the valve assembly in relation to increments of valve stem travel. The annular clearance indicated at 13 between the surface of the plug member 10 and the uppermost inner rim of the opening through the seat member 6 determines the quantity of fluid flow as being the place of least area, which the fluid passes in flowing from the inlet branch 2 to the outlet branch 3 of the assembly.

By the construction illustrated, the restricting area, controlling the quantity of flow, is not that area between the valve seating surfaces 7 and 12, and therefore the greatest attrition does not come upon the valve seating and sealing surfaces. Furthermore, I have provided the valve member 11 with an annular groove or channel 14 lying inwardly and recessed upwardly from the valve seating surface 12, and against which surface the fluid flowing through the annular restriction 13 will impinge and lose velocity before passing through the enlarged exit area between the valve sealing surfaces 7 and 12. The path of the fluid is shown in general by the arrow 15.

In Fig. 2 I have shown a fragment of the casing 1 of Fig. 1 wherein the seat member 16 screw threaded into the partition 4 is of a slightly different shape than the seat member 6 of Fig. 1, having a cylindrical interior wall as compared to the curved interior wall of the seat member 6. An inwardly projecting shelf 17 is preferably slotted and provides a means for removing readily the seat member 16, through the insertion downwardly of a bar which matches the slot, and after removal from the assembly of the side cover flange and valve stem assembly. In Fig. 1 a means of removal of the seat member 6 is shown as a square formed as the lower part of the opening therethrough and in which may be inserted a square bar for turning or unscrewing the seat member.

In Fig. 2 the plug member 18 is similar in character but somewhat different in contour than the plug member 10; but the control of fluid flow, is, as is the case in Fig. 1, controlled by the annular area of restriction between the topmost edge of the inner surface of the seat member 16 and that point of the surface of the plug member 18 lying adjacent at any vertical position of the plug member.

The valve member 19 differs from the valve member 11 in that it extends outwardly and downwardly from the seating surface 12 to form a shroud or guides having a reasonably close clearance around the cylindrical exterior of the seat member 16. The guides are shown as four in number, indicated at 20. In the valve member 19, adjacent the outermost edge of the coniformed seating surface 12, I have provided an annular recess 21 which cuts through the guide members 20 to form a ready exit and dispersing chamber for fluids flowing outwardly past the valve sealing surfaces at a time when the valve is very slightly open and a very small clearance exists between the valve sealing surfaces. Thus I prevent direct impingement of the fluid upon the guiding members 20 with corresponding wear thereof and backpressure or restriction to flow.

With my construction I have a single seat valve wherein the various throttling or controlling parts are readily removable for inspection or replacement, and have the advantage of shaping certain of the members to obtain desirable characteristics of fluid flow for equal increments of valve stem travel. I have the further advantage that the velocity of the fluid flowing past the valve sealing surfaces is lower than where it passes the quantity controlling restriction, and thereby I minimize the attrition or wire-drawing of the valve sealing surfaces. In addition, the flowing fluid is kept from direct impingement against any of the valve sealing surfaces and against any parts where such impingement would tend to react and restrict the flow.

While I have illustrated and described certain preferred embodiments of my invention, it is understood that by so doing I have not limited myself other than as stated in the claims in view of prior art.

What I claim as new and desire to secure by Letters Patent of the United States, is:

1. A valve of the class described, comprising a chambered casing having a dividing wall portion, a seat member positioned in said wall portion and having an opening for the passage of fluid, said seat member having an annular seating surface, and a cooperating valve means comprising a removable and renewable member having a seating surface adapted to engage said annular seating surface for sealing the same, and a projecting extension in advance of the renewable member and removably secured thereto to constitute means to fasten the renewable member in place and to enter said opening, said extension defining with said seat member an annular restriction for controlling the rate of fluid flow through the valve when said seating surfaces are not sealed, said renewable member having guiding arms closely fitting the external surface of said seat member between said annular seating surface and said wall portion and having an annular channel cutting said guiding arms adjacent the exit edge of its seating surface.

2. A valve of the class described, comprising a chambered casing having a dividing wall portion, a seat member positioned in said wall portion and having an opening for the passage of fluid, said seat member having an annular seating surface, and a cooperating valve means having a seating surface adapted to engage said annular seating surface for sealing the same, said valve means having guiding arms closely fitting the external surface of said seat member between said annular seating surface and said wall portion, and having an annular channel cutting said guiding arms adjacent the exit edge of its seating surface.

3. A valve of the class described, comprising a chambered casing having a dividing wall portion, a seat member positioned in said wall portion and having an opening for the passage of fluid, said seat member having an annular seating surface, and a cooperating valve means comprising a removable and renewable member having a seating surface adapted to engage said annular seating surface for sealing the same, said renewable member having guiding arms closely fitting the external surface of said seat member between said annular seating surface and said wall portion and having an annular channel cutting said guiding arms adjacent the exit edge of its seating surface.

4. In a valve of the class described, a seat member having an annular seating surface, a cooperating valve member having a matching seating surface, guiding arms closely fitting the external surface of said seat member and an annular channel cutting said guiding arms adjacent the exit edge of its seating surface, said members being adapted to close passage through said valve when said seating surfaces are in sealing contact, and means positioned with said valve member relative to the seat member for controlling the rate of fluid flow through the valve.

5. In a valve of the class described, a seat member having an annular seating surface, a cooperating valve member having a matching seating surface, guiding arms closely fitting the external surface of said seat member and an annular channel cutting said guiding arms adjacent the exit edge of its seating surface, said members being adapted to close passage through said valve when the seating surfaces are in sealing contact, and means positioned with said valve member relative to the seat member for controlling the rate of fluid flow through said valve, said means forming with said seat member a restriction to fluid flow through which the velocity of flow is greater than between said seating surfaces.

6. A valve of the class described, comprising a chambered casing having a dividing wall portion, a seat member positioned in said wall portion and having an opening for the passage of fluid, said seat member having an annular seating surface, and a cooperating valve member capable of being positioned by a valve stem relative to said seat member and having a matching seating surface adapted to close said opening to the passage of fluid when said seating surfaces are in sealing contact, said valve member having guiding arms closely fitting the external surface of said seat member between the annular seating surfaces and said wall portion, an annular channel cutting said guiding arms adjacent the exit edge of its seating surface, said valve member being shaped to form with said seat member a restriction to flow of less area at a point preceding the valve seating surfaces in the direction of flow than between said surfaces, when surfaces are not in sealing contact.

7. A valve of the class described, comprising a chambered casing having a dividing wall portion, a seat member positioned in said wall portion and having an opening for the passage of fluid, said seat member having an annular seating surface, and a cooperating valve member capable of being positioned by a valve stem relative to said seat member and having a matching seating surface adapted to close said opening to the passage of fluid when the seating surfaces are in sealing contact, said valve member having guiding arms closely fitting the external surface of said seat member between the annular seating surface and said wall portion, an annular channel cutting said guiding arms adjacent the exit edge of its seating surface, said valve member being of a shape such that the velocity of fluid flow between said seating surfaces is less than at a point preceding the valve seating surfaces in the direction of flow when said surfaces are not in sealing contact.

8. A valve of the class described, comprising a chambered casing having a dividing wall portion, a seat member positioned in said wall portion and having an opening for the passage of fluid, said seat member having an annular seating surface, and a cooperating valve member capable of being positioned by a valve stem relative to said seat member and having a matching seating surface adapted to close said opening to the passage of fluid when said seating surfaces are in sealing contact and having guiding arms closely fitting the external surfaces of said seat member between said annular seating surfaces and said wall portion and an annular channel cutting said guiding arms adjacent the exit edge of its seating surface, said members being shaped to allow a fluid flowing between said seating surfaces to expand in volume from that of the passage through which the fluid reached said seating surfaces.

9. A valve of the class described, comprising a chambered casing having a dividing wall portion, a seat member positioned in said wall portion and having an opening for the passage of fluid, said seat member having an annular seating surface, and a coperating valve member capable of being positioned by a valve stem relative to said seat member, and having a matching seating surface adapted to close said opening to the passage of fluid when said seating surfaces are in sealing contact and having guiding arms closely fitting the external surface of said seat member between said annular seating surface and said wall portion and an annular channel cutting said guiding arms adjacent the exit edge of its seating surface, said members being shaped to define a space preceding said seating surfaces in the direction of flow wherein some of the kinetic energy of the flowing fluid is expended by impact on a surface other than either of said seating surfaces.

10. A valve of the class described, comprising a chambered casing having a dividing wall portion, a seat member positioned in said wall portion and having an opening for the passage of fluid, said seat member having an annular seating surface, and a cooperating valve member capable of being positioned by a valve stem relative to said seat member, said valve member having a matching seating surface adapted to close said opening to the passage of fluid when said seating surfaces are in sealing contact and having an extension protruding into the opening in said seat member beyond said seating surfaces in the direction of flow, said extension being shaped to define with said seat member a restricted area, said valve member and extension being so shaped that equal increments of valve stem motion result in equal increments of change in area between said seating surfaces, but in unequal increments of change of said restricted area.

JOSEPH M. BARRETT.